(12) United States Patent
Chen et al.

(10) Patent No.: US 10,918,228 B2
(45) Date of Patent: Feb. 16, 2021

(54) SCREEN FRAME AND LASER PROJECTION DISPLAY DEVICE

(71) Applicant: HISENSE LASER DISPLAY CO., LTD., Qingdao (CN)

(72) Inventors: Bo Chen, Qingdao (CN); Yongda Huang, Qingdao (CN); Fei Zhao, Qingdao (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 0 days.

(21) Appl. No.: 16/576,731

(22) Filed: Sep. 19, 2019

(65) Prior Publication Data
US 2020/0204769 A1 Jun. 25, 2020

Related U.S. Application Data

(63) Continuation of application No. PCT/CN2019/098656, filed on Jul. 31, 2019.

(30) Foreign Application Priority Data

Dec. 19, 2018 (CN) .......................... 201811556268.8
Dec. 19, 2018 (CN) .......................... 201811556774.7

(51) Int. Cl.
*A47G 1/10* (2006.01)
*G03B 21/56* (2006.01)
(Continued)

(52) U.S. Cl.
CPC ............. *A47G 1/102* (2019.08); *G03B 21/56* (2013.01); *G03B 21/58* (2013.01); *G03B 21/60* (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 3,583,466 A * 6/1971 Dreyer .................... G03B 21/58
160/351
5,313,307 A * 5/1994 Gotou .................. H04N 9/3147
348/786
(Continued)

FOREIGN PATENT DOCUMENTS

CN          2660633 Y      12/2004
CN        106820808 A       6/2017
(Continued)

OTHER PUBLICATIONS

The Chinese International Search Report of corresponding International application No. PCT/CN2019/098656, dated Oct. 24, 2019.

*Primary Examiner* — Clayton E. LaBalle
*Assistant Examiner* — Kevin C Butler
(74) *Attorney, Agent, or Firm* — J.C. Patents

(57) ABSTRACT

Provided are a screen frame and a laser projection display device. The screen frame includes a plurality of side frames that are connected end to end, where a joint of each two of the plurality of side frames is provided with at least two connectors and receiving grooves corresponding to the at least two connectors in a one to one manner, and the at least two connectors have inserting portions extendable into the receiving grooves, at least one inserting portion of the inserting portions is provided with a telescopic engaging member, and a side wall of a receiving groove which is corresponding to an inserting portion having the engaging member is provided with a receiving hole corresponding to the engaging member; the engaging member is configured to
(Continued)

extend into the receiving hole for positioning; and the inserting portions are connected to side walls of the receiving grooves by fasteners.

20 Claims, 12 Drawing Sheets

(51) Int. Cl.
  *G03B 21/64* (2006.01)
  *H04N 9/31* (2006.01)
  *G03B 21/58* (2014.01)
  *G03B 21/60* (2014.01)
  *G03B 21/62* (2014.01)
  *G03B 21/625* (2014.01)
  *G03B 21/54* (2006.01)
  *G03B 21/20* (2006.01)

(52) U.S. Cl.
  CPC ............ *G03B 21/62* (2013.01); *G03B 21/625* (2013.01); *G03B 21/64* (2013.01); *H04N 9/3161* (2013.01); *G03B 21/2033* (2013.01); *G03B 21/54* (2013.01)

(58) Field of Classification Search
  USPC ............................................................. 359/443
  See application file for complete search history.

(56) References Cited

U.S. PATENT DOCUMENTS

| | | | | |
|---|---|---|---|---|
| 5,317,449 A | * | 5/1994 | Furuno | G03B 21/10 348/E5.138 |
| 6,785,047 B1 | * | 8/2004 | Risher | G03B 21/58 359/443 |
| 7,369,310 B1 | * | 5/2008 | Risher | G03B 21/56 359/443 |
| 8,040,602 B1 | * | 10/2011 | Hochendoner | G03B 21/58 359/443 |
| 2005/0200951 A1 | * | 9/2005 | Redmon | G09F 1/12 359/443 |
| 2006/0124255 A1 | * | 6/2006 | Manzella | E06B 9/52 160/371 |
| 2008/0094698 A1 | * | 4/2008 | Enochs | G03B 21/58 359/443 |
| 2008/0285126 A1 | * | 11/2008 | Bartle | G03B 21/58 359/450 |
| 2010/0155554 A1 | * | 6/2010 | Wagenhoffer, Jr. | G09F 23/00 248/223.31 |
| 2012/0206661 A1 | * | 8/2012 | Risher | F16M 11/04 348/789 |
| 2019/0227422 A1 | * | 7/2019 | Chen | F16M 13/02 |
| 2020/0204769 A1 | * | 6/2020 | Chen | A47G 1/102 |

FOREIGN PATENT DOCUMENTS

| | | | | |
|---|---|---|---|---|
| CN | 206750685 U | | 12/2017 | |
| CN | 206757285 | * | 12/2017 | ............ G03B 21/54 |
| CN | 206757285 U | | 12/2017 | |
| CN | 207133568 | * | 3/2018 | ............ G03B 21/56 |
| CN | 207133568 U | | 3/2018 | |
| CN | 108681201 | * | 10/2018 | ............ G03B 21/56 |
| CN | 108681201 A | | 10/2018 | |
| KR | 10-0956681 | | 5/2010 | |

* cited by examiner

US 10,918,228 B2

1

SCREEN FRAME AND LASER PROJECTION DISPLAY DEVICE

CROSS-REFERENCE TO RELATED APPLICATION

The present application is a continuation of International Application No. PCT/CN2019/098656, filed on Jul. 31, 2019, which claims priority to Chinese Patent Application No. 201811556268.8, filed on Dec. 19, 2018 and entitled "Screen Frame and Laser Projection Display Device" and Chinese Patent Application No. 201811556774.7, filed on Dec. 19, 2018 and entitled "Screen Frame and Laser Projection Display Device". The disclosures of the aforementioned applications are incorporated by reference herein in their entireties.

TECHNICAL FIELD

The present disclosure relates to the field of displayer, and in particular, to a screen frame and a laser projection display device.

BACKGROUND

With a continuous development of technology and an improvement of people's living standards, a new laser projection display device has been more and more widely used.

At present, in a laser projection screen, a frame type screen has the advantages of light weight, low cost, and easy assembly, and thus has been widely used. The frame type screen is formed by joining a plurality of side frames.

SUMMARY

The present disclosure provides a screen frame and a laser projection display device, which can realize accurate alignment and joining relatively easily.

In one aspect, the present disclosure provides a screen frame including a plurality of side frames that are connected end to end, where a joint of each two adjacent side frames of the plurality of side frames is provided with at least two connectors, and the each two adjacent side frames are provided with receiving grooves at the joint of the each two adjacent side frames, where the receiving grooves are corresponding to the at least two connectors in a one to one manner, and the at least two connectors have inserting portions that are extendable into the receiving grooves, at least one inserting portion of the inserting portions is provided with a telescopic engaging member, and a side wall of a receiving groove which is corresponding to an inserting portion having the engaging member is provided with a receiving hole corresponding to the engaging member; the engaging member is configured to extend into the receiving hole for positioning; and the inserting portions are connected to side walls of the receiving grooves by fasteners.

In another aspect, the present disclosure provides a laser projection display device including a projection host, a projection screen, and a screen frame as described above, the screen frame is disposed around the projection screen from outside.

In the screen frame provided by the present disclosure, the side frames are provided with receiving grooves, the inserting portions of the connectors and the side walls of the receiving grooves can be connected by the fasteners, and at least one inserting portion of the inserting portions of the connectors is provided with telescopic engaging members, and correspondingly, the side wall of the receiving groove which is corresponding to an inserting portion having the telescopic engaging member is further provided with the receiving hole. Therefore, when the connectors are connected and fixed to the side frames, a snapping limiting is realized by the engaging member of the inserting portion and the receiving hole on the side wall of the receiving groove, which can quickly realize a relative positioning of the connectors and the side frames, thereby improving a mounting efficiency, so that a person who does not have any assembly experience can complete an assembly of the screen frame relatively easily, thereby facilitating a user to freely assemble the screen frame and saving assembly costs.

On the basis of the present disclosure, more implementation scenarios may be obtained obviously. It should be understood that numerous implementations of the present disclosure may be implemented separately or in combination with one or more implementations. The statements of the implementations set forth in the present disclosure are intended to be illustrative of the present disclosure and are not intended to limit the present disclosure.

BRIEF DESCRIPTION OF THE DRAWINGS

In order to more clearly illustrate the technical solutions in embodiments of the present disclosure or in the related art, drawings needed to be used in describing the embodiments or the related art will be briefly described below. Obviously, the drawings in the following description are some of the embodiments of the present disclosure, and the person skilled in the art can obtain other drawings according to these drawings without any creative work.

DESCRIPTION OF THE REFERENCE SIGNS 1, 1a, 1b, 10—side frame; 20—corner connector; 2—connector; 2a—first connector; 2b—second connector; 11—receiving groove; 12—receiving hole; 13, 14, 20b, 23a, 23b—connecting hole; 33, 34—fastener; 21, 211a, 211b, 212a, 212b—inserting portion; 22—engaging member; 24—reinforcing rib; 201—extending portion; 221—snapping end; 241—limiting surface; 300—laser projection display device; 301—projection screen; 302—screen frame; 303—projection host.

DETAILED DESCRIPTION OF THE EMBODIMENTS

In order to make the objects, technical solutions and advantages of the embodiments of the present disclosure clearer, the technical solutions in the embodiments of the present disclosure will be clearly and completely described in the below with reference to the drawings in the embodiments of the present disclosure. Obviously, the described embodiments are a part of, rather than all of, the embodiments of the present disclosure. All other embodiments obtained by the person skilled in the art based on the embodiments of the present disclosure without any creative work belong to the scope of the present disclosure.

Figure 1:
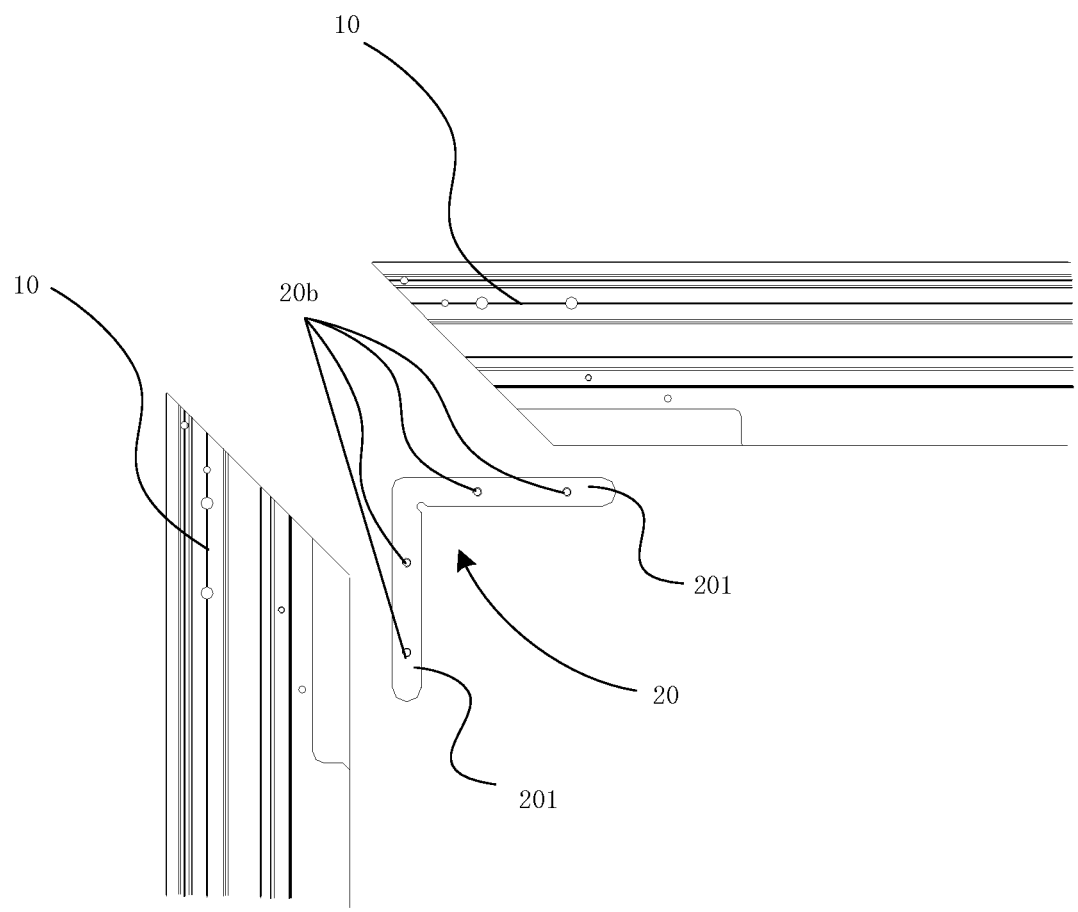
FIG. 1 is a schematic structural diagram of a frame type screen in the related art.

FIG. 1 is a schematic structural diagram of a frame type screen in the related art. As shown in FIG. 1, when the side frames 10 are joined together, two side frames 10 corresponding to two adjacent side edges of the screen are connected by a corner connector 20. The corner connector 20 has two extending portions 201 at right angles to each other, a seam of the side frames 10 is provided with sliding grooves (not shown), and an extending portion 201 of the corner connector 20 can be extended into the sliding groove of one of the side frames 10, and the other extending portion 201 extends into the sliding groove of the other side frame 10 along another direction, and correspondingly, connecting holes 20b are provided on the side frames 10 and the extending portions 201 of the connector 20 respectively. After the extending portions 201 extend into the corresponding sliding grooves, the corresponding connecting holes 20b need to be visually aligned, and then fasteners such as screws are sequentially threaded through the plurality of connecting holes 20b for fastening, and thereby the corner connector 20 and the side frames 10 are connected together to complete an assembly of the side frames.

In the current laser projection screen, on the one hand, when aligning the connecting holes 20b provided on the side frames 10 and the extending portions 201, it is difficult to perform accurate alignment, and it is often necessary to make multiple attempts to accurately align the positions, which cause it is difficult to adjust the positions of and the seam between adjacent side frames, so that phenomenon that the side frames is misplaced, the seam is too large, or the seam is uneven may occur; on another hand, after the alignment is completed, it is necessary to maintain a relative position of the side frames 10 and the corner connectors 20 unchanged, for example, maintaining the corner connector 20 in a state of extending into the sliding groove, until the fastening of the fasteners is completed; on further another hand, generally, in order to make the assembly of the corner connector 20 and the side frames 10 more robust, it needs to set a plurality pairs of connecting holes 20b, so that the above mounting process needs to be repeated many times, which makes the mounting efficiency of the frame type screen very low. The user experience is poor, which is not conducive to user's independent mounting.

In order to enable accurate positioning and joining to be performed easily, the present disclosure provides a screen frame and a laser projection display device. The embodiments of the present disclosure will be described below with reference to the accompanying drawings.

Figure 2A:
FIG. 2a is a schematic structural diagram of a screen frame according to some embodiments of the present disclosure.
Figure 2B:
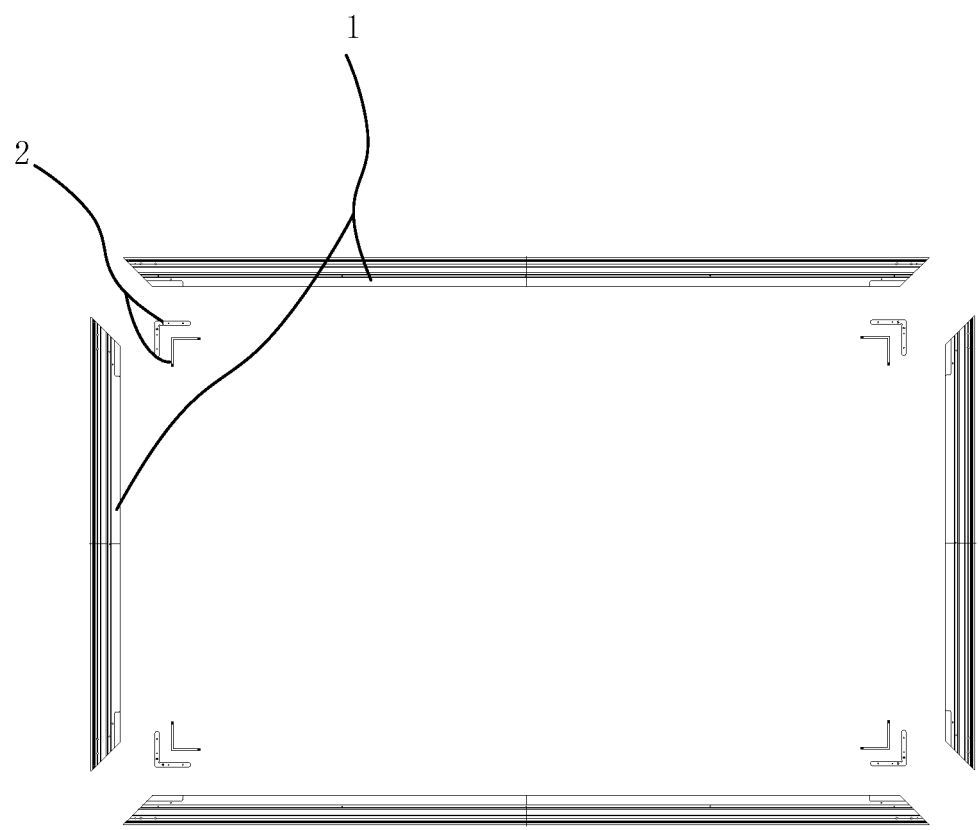
FIG. 2b is a schematic exploded diagram of a screen frame according to some embodiments of the present disclosure.
Figure 3A:
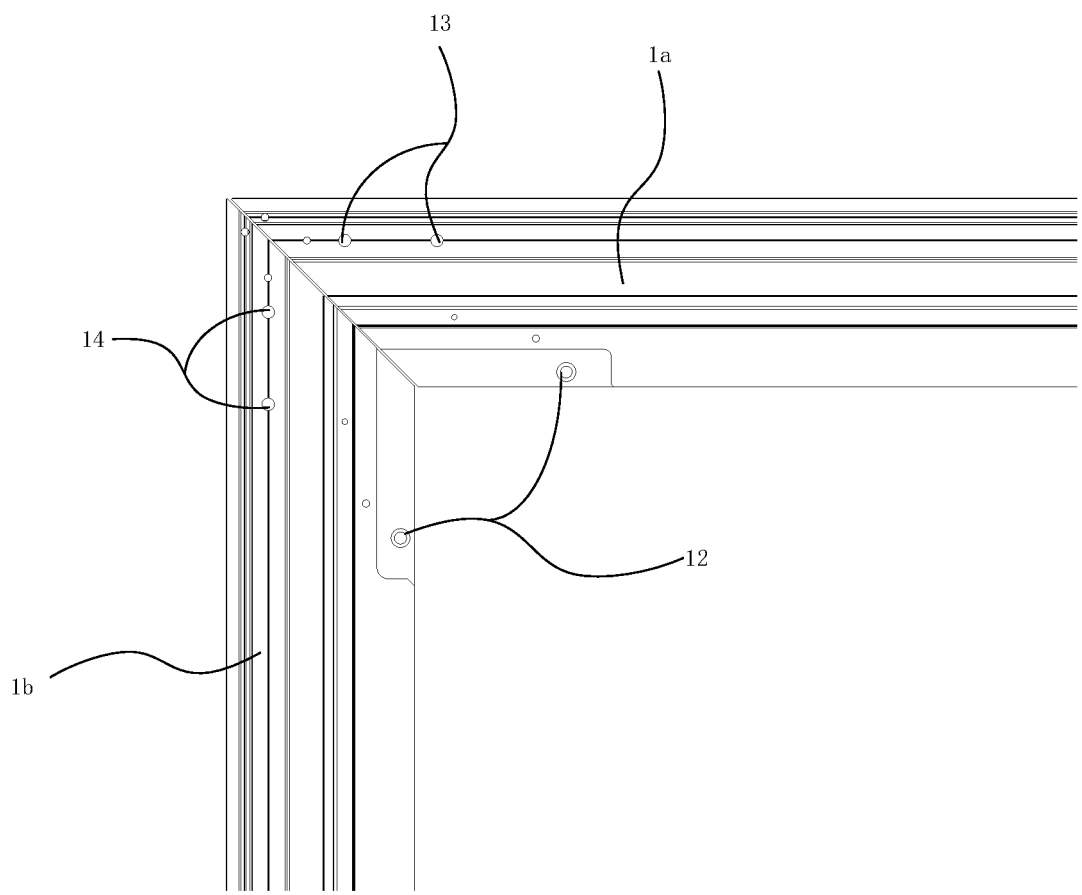
FIG. 3a is a schematic diagram showing a connection position of two adjacent side frames in a screen frame according to some embodiments of the present disclosure.
Figure 3B:
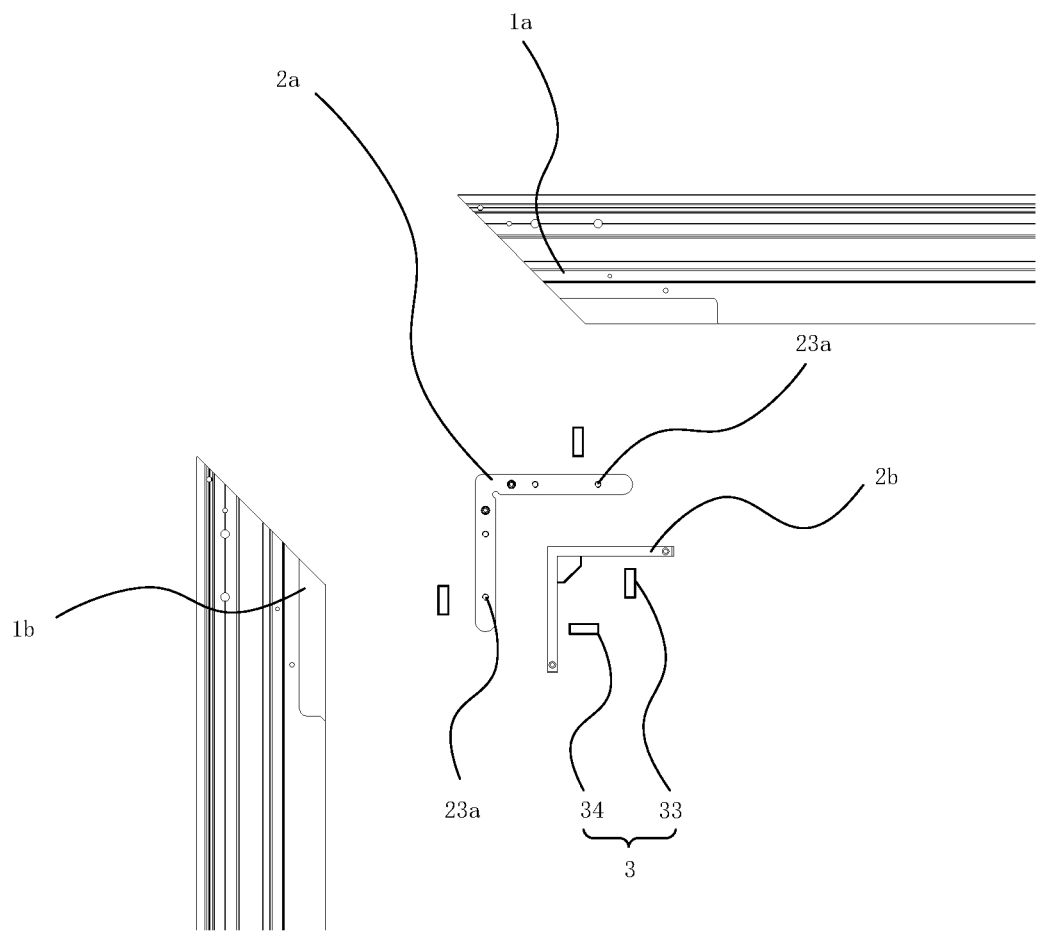
FIG. 3b is a schematic exploded diagram of a connection position of two adjacent side frames in a screen frame according to some embodiments of the present disclosure.
Figure 4A:
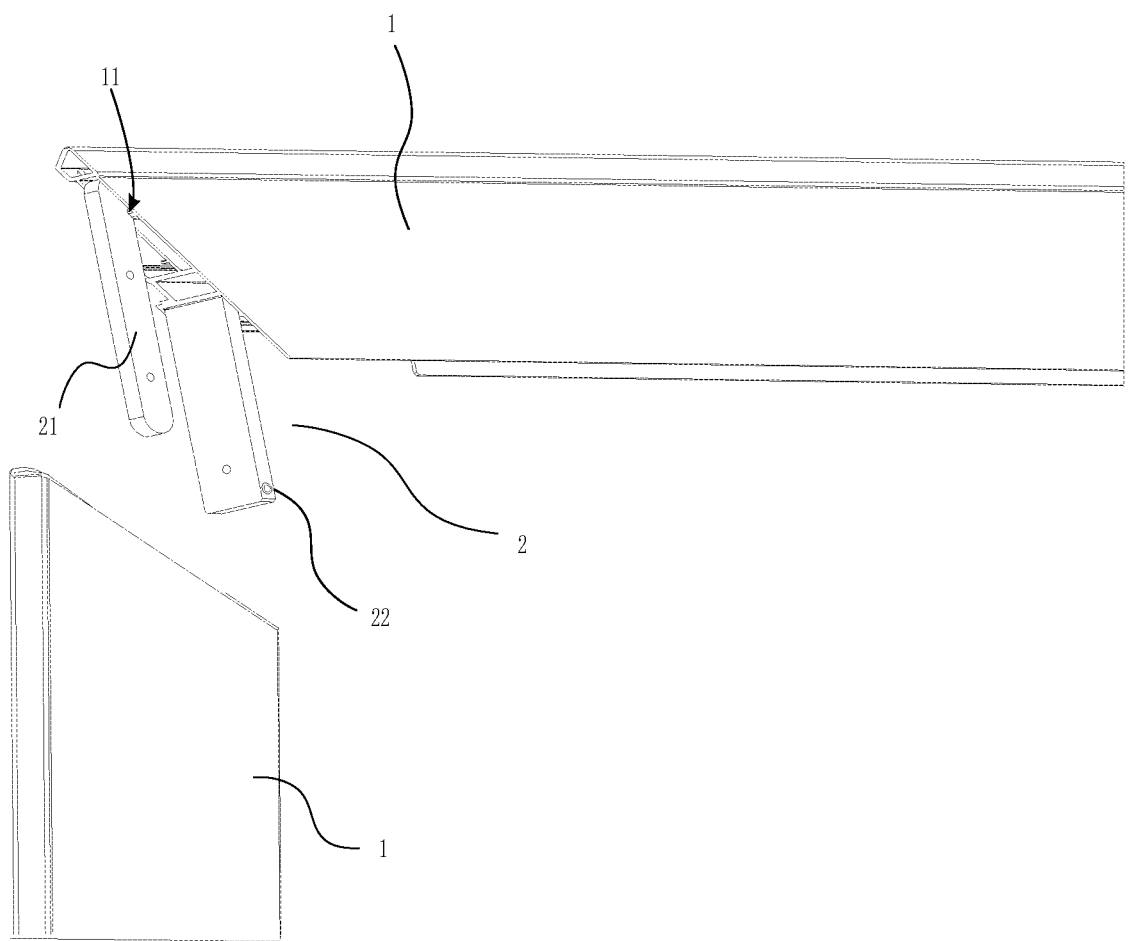
FIG. 4a is a schematic diagram of a connection structure of connectors and side frames in a screen frame according to some embodiments of the present disclosure.
Figure 4B:
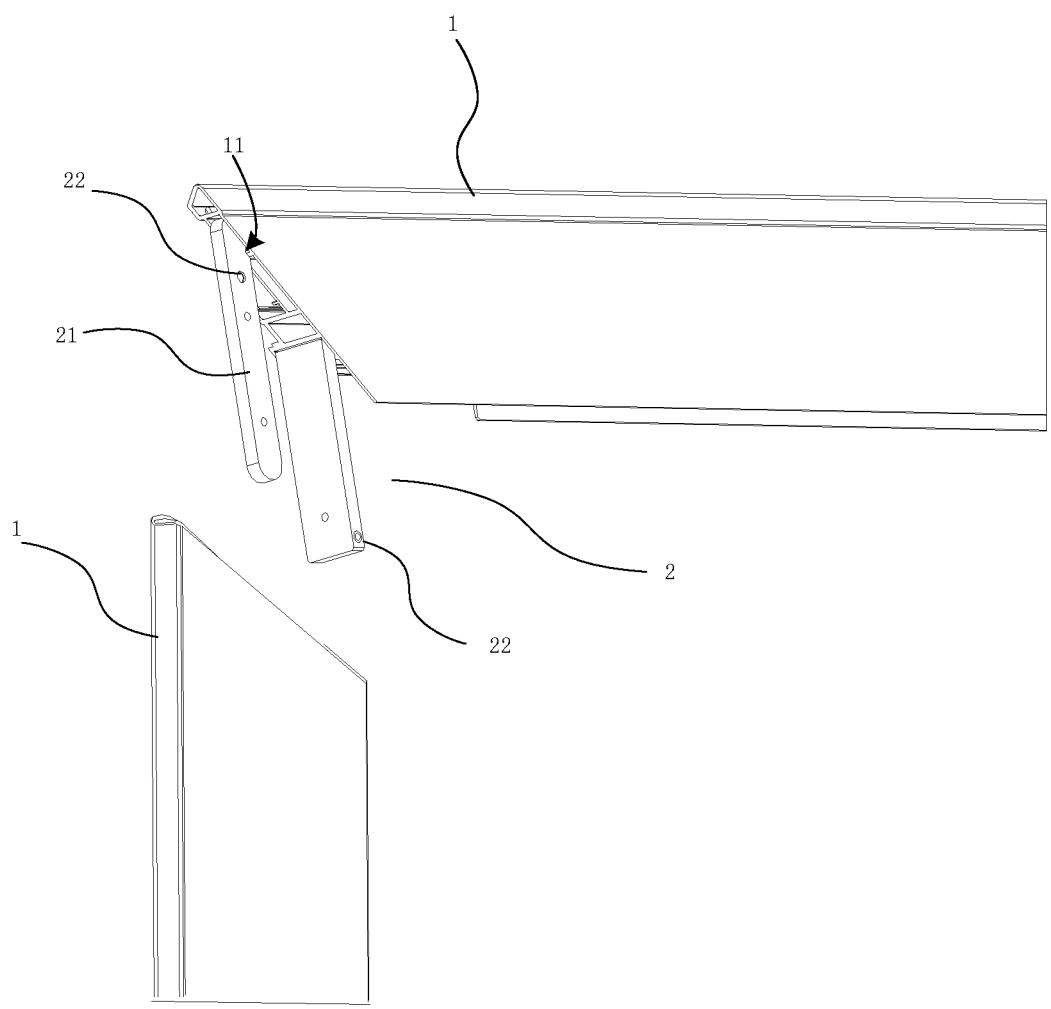
FIG. 4b is a schematic diagram of a connection structure of connectors and side frames in a screen frame according to some other embodiments of the present disclosure.
Figure 5A:
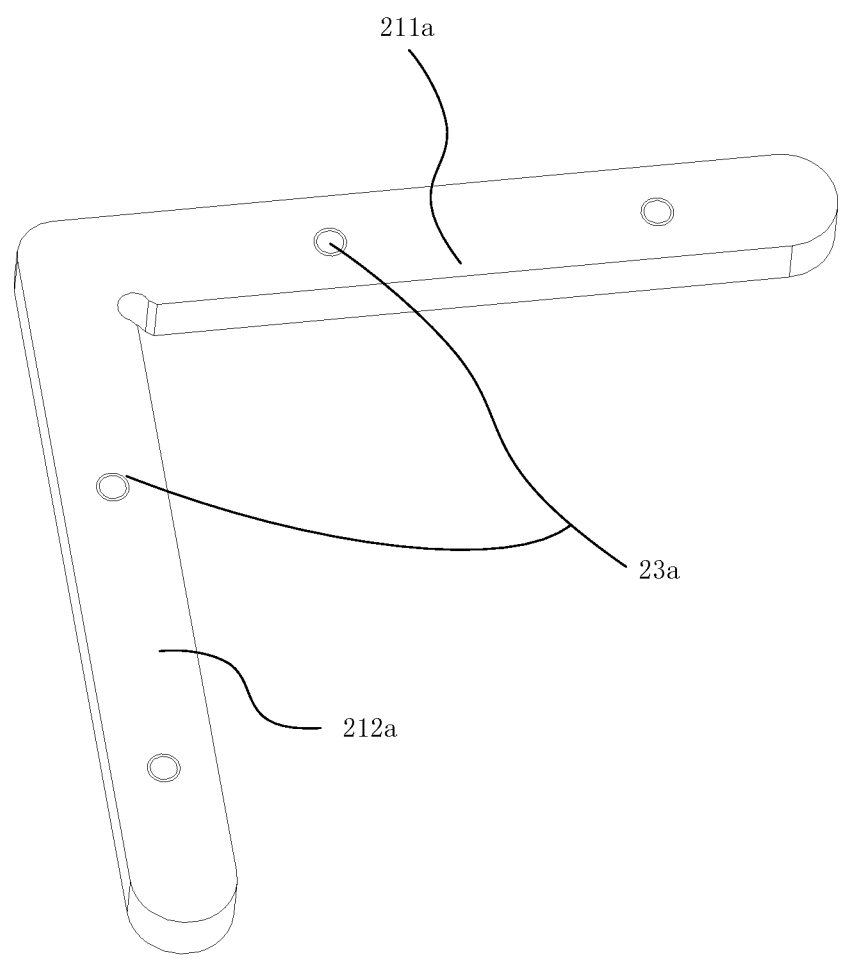
FIG. 5a is a schematic structural diagram of a first connector in a screen frame according to some embodiments of the present disclosure.
Figure 5B:
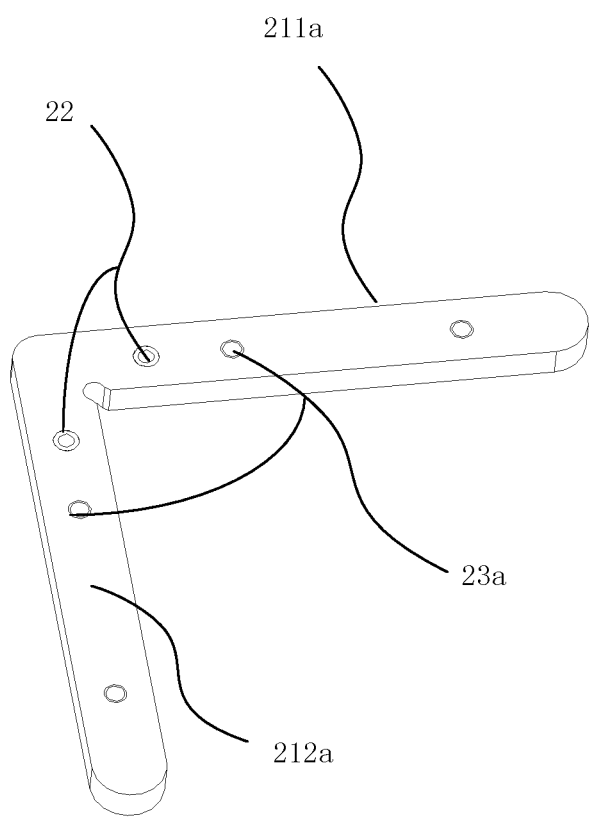
FIG. 5b is a schematic structural diagram of a first connector in a screen frame according to some other embodiment of the present disclosure.
Figure 6A:
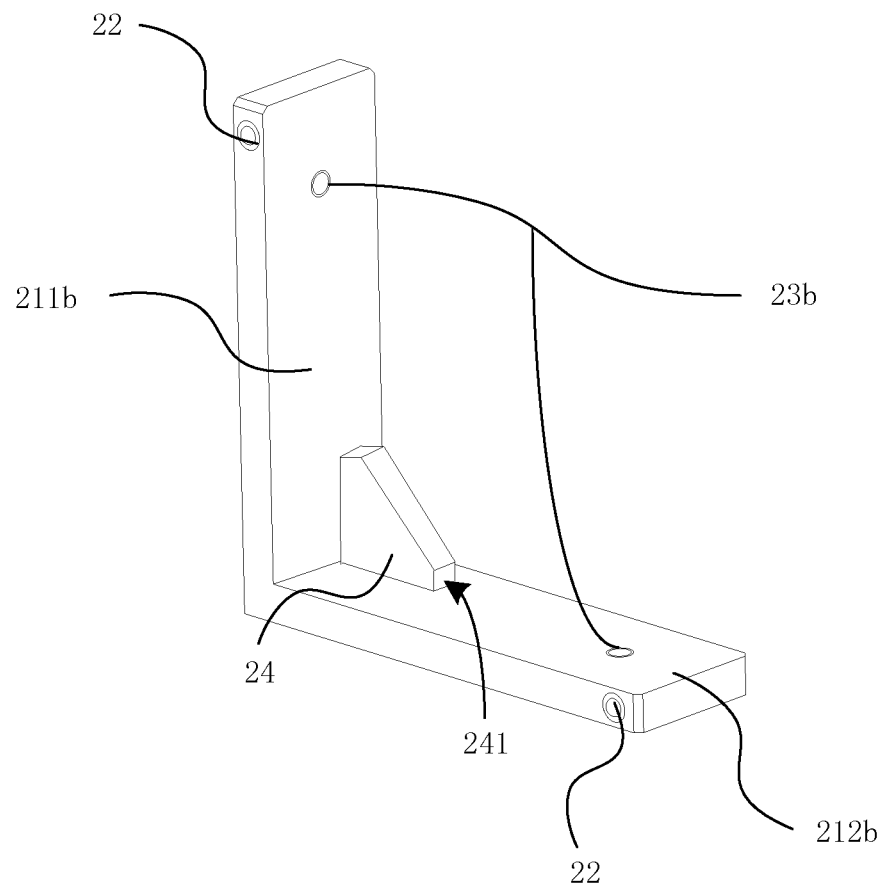
FIG. 6a is a schematic structural diagram of a second connector in a screen frame according to some embodiments of the present disclosure.
Figure 6B:
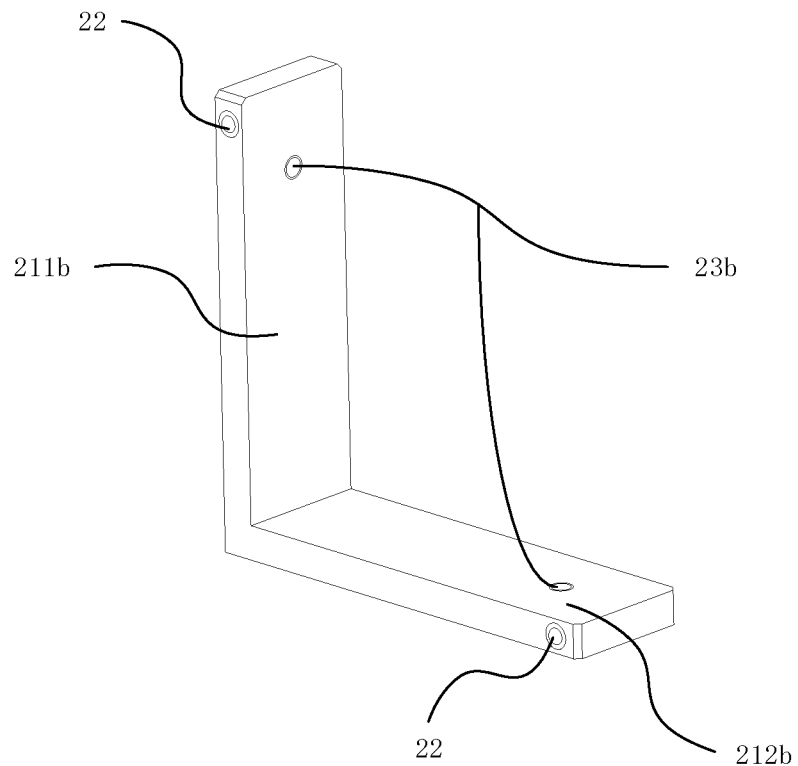
FIG. 6b is a schematic structural diagram of a second connector in a screen frame according to some other embodiments of the present disclosure.
Figure 7:
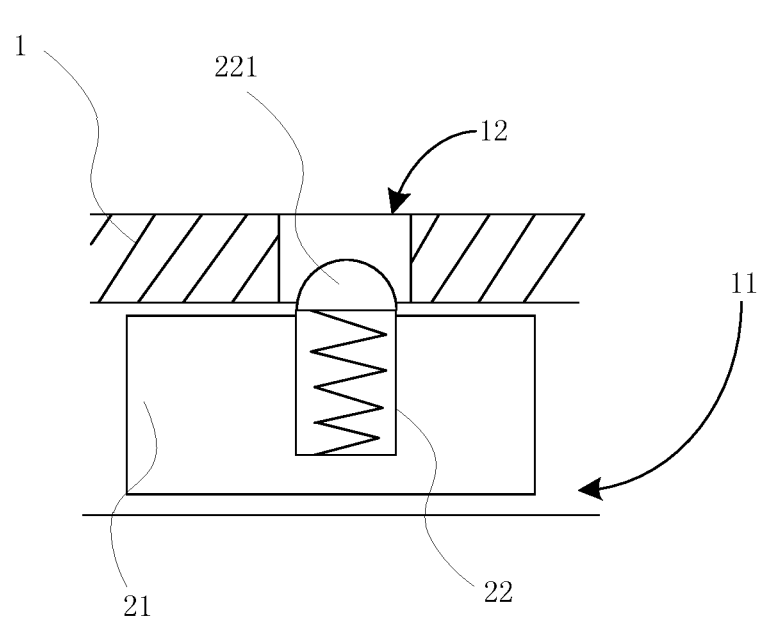
FIG. 7 is a schematic diagram of a connection structure of an engaging member and a side frame in a screen frame according to some embodiments of the present disclosure.

FIG. 2a is a schematic structural diagram of an assembled screen frame according to some embodiments of the present disclosure. FIG. 2b is a schematic exploded diagram of a screen frame according to some embodiments of the present disclosure. FIG. 3a is a schematic diagram showing a connection position of two adjacent side frames in a screen frame according to some embodiments of the present disclosure. FIG. 3b is a schematic exploded diagram of a connection position of two adjacent side frames in a screen frame according to some embodiments of the present disclosure. FIG. 4a is a schematic diagram of a connection structure of connectors and side frames in a screen frame according to some embodiments of the present disclosure. FIG. 4b is a schematic diagram of a connection structure of connectors and side frames in a screen frame according to some other embodiments of the present disclosure. FIG. 5a is a schematic structural diagram of a first connector in a screen frame according to some embodiments of the present disclosure. FIG. 5b is a schematic structural diagram of a first connector in a screen frame according to some other embodiment of the present disclosure. FIG. 6a is a schematic structural diagram of a second connector in a screen frame according to some embodiments of the present disclosure. FIG. 6b is a schematic structural diagram of a second connector in a screen frame according to some other embodiments of the present disclosure. FIG. 7 is a schematic diagram of a connection structure of an engaging member and a side frame in a screen frame according to some embodiments of the present disclosure.

Referring to a partial schematic view of a corner connection of the screen frame shown in FIGS. 3a-4b, a screen frame according to some embodiments of the present disclosure includes a plurality of side frames 1 that are connected end to end, a joint of two adjacent side frames 1 is provided with at least two connectors 2, and each of all the connectors 2 is disposed between two adjacent side frames, for example, between a side frame 1a and a side frame 1b, and each of all the connectors 2 is connected to the side frames 1 by fasteners 3.

When the two adjacent side frames 1 are connected by the connectors 2, there may be a plurality of different connection structures and connection manners for the connectors 2 and the side frames 1. In order to prevent the connectors 2 from affecting the overall appearance of the screen frame, the side frames 1 can be used to block or receive the connectors 2, so that the connectors 2 are prevented from being exposed. In a connection structure according to some embodiments of the present disclosure, receiving grooves 11 are provided at a joint of the two adjacent side frames 1, where the receiving grooves 11 are corresponding to the connectors 2 in a one to one manner, and a depth direction of the receiving grooves 11 is along a length direction of the side frame 1. The connectors 2 have inserting portions 21 that are extendable into the receiving grooves 11, and the fasteners 3 pass through side walls of the receiving grooves 11 and the inserting portions 21 to connect the connectors 2 and the side frame 1.

As shown in FIGS. 4a and 4b, an inserting portion 21 is provided with a telescopic engaging member 22, and as shown in FIG. 7, a side wall of a receiving groove 11 is provided with a receiving hole 12 corresponding to the engaging member, and the engaging member 22 can extend into and be snapped within the receiving hole 12 to realize a positioning limiting function. When assembling, the engaging member 22 is inserted into the receiving groove 11 along with the inserting portion 21. Since the engaging member 22 is telescopic, the engaging member 22 is in a forced compression state before extending into the receiving hole 12. When the engaging member 22 reaches a position of the receiving hole 12, the engaging member 22 springs up into the receiving hole 12, and the receiving hole 12 limits the engaging member 22 at this position.

In some embodiments of the present disclosure, the receiving grooves 11 are located at an end of a side frame 1 that abuts an adjacent side frame, and openings of the receiving grooves 11 may be located at an end surface of the side frame 1 that abuts the adjacent side frame. At this time, the inserting portions 21 of the connectors 2 can extend toward the end of the side frame 1 and be inserted into the receiving grooves 11 through the openings of the receiving grooves 11. Viewed from an outside of the screen frame, the connectors 2 are received and hidden in the receiving grooves 11, so that the appearance of the screen frame is relatively simple and beautiful. Since the inserting portions 21 are located in the receiving grooves 11, the fasteners 3 can be threaded through the side walls of the receiving grooves 11 and the inserting portions 21 to connect the connectors 2 and the side frame 1 together. In some embodiments of the present disclosure, connecting holes for threading the fasteners 3 may be disposed at the side walls of the receiving grooves 11 and surfaces of the inserting portions 21 opposite to the side walls. When the connectors 2 and the side frame 1 are mounted in position, positions of the connecting holes of the receiving groove 11 and the connecting holes of the inserting portions 21 overlap, and then the fasteners 3 can pass through the connecting holes for connection. When the fasteners 3 are threaded connectors, one of the connecting hole of the receiving groove 11 and the connecting hole of the inserting portion 21 may be an unthreaded hole and the other may be a threaded hole.

At this time, since the connectors 2 are mounted inside the side frames 1, abutting portions of the two side frames 1a and 1b can have mutually matching shapes, which can form a neat and beautiful appearance of the screen frame.

In the screen frame according to the above embodiment, the side frames are provided with the receiving grooves, the inserting portions of the connectors and the side walls of the receiving grooves can be connected by the fasteners 3, and at least one inserting portion of the inserting portions of the connectors is provided with telescopic engaging members, and correspondingly, the side wall of the receiving groove which is corresponding to an inserting portion having the telescopic engaging member is further provided with the receiving hole. Therefore, when the connectors are connected and fixed to the side frames, a snapping limiting is realized by the engaging member of the inserting portion and the receiving hole on the side wall of the receiving groove, which can quickly realize a relative positioning of the connectors and the side frames, thereby improving a mounting efficiency, and can also enable a person who does not have any assembly experience to complete an assembly of the screen frame relatively easily, thereby facilitating a user to freely assemble the screen frame and saving assembly costs.

Further, as shown in FIG. 3b, the at least two connectors 2 may be four groups of connectors respectively disposed at four corner joints of the rectangular screen frame, each group of connectors includes two connectors.

In some embodiments of the present disclosure, the connectors 2 include a first connector 2a and a second connector 2b, where the first connector 2a and the second connector 2b are arranged along a diagonal line of the screen frame, the first connector 2a is located outside of the second connector 2b.

When two adjacent side frames are connected by the connectors 2, a proper relative position needs to be maintained between the connectors 2 and the side frames 1 for properly connection and assembly. In some embodiments of the present disclosure, one or more telescopic engaging members 22 may be disposed on the first connector 2a or the second connector 2b, in order to ensure the accurate positioning between the connectors 2 and the side frames 1, when the connectors 2 have inserting portions 21, the side frames 1 are provided with the receiving grooves 11, and the connectors 2 and the side frames 1 are connected by a mutual cooperation of the insertion portions 21 and the receiving groove 11. Each of the engaging members 22 includes a snapping end 221 that can extend out of an outer surface of the inserting portion 21. At least one side frame of the side frames 1 is provided with a receiving hole 12 corresponding to the engaging member. The snapping end 221 extends into and is snapped within the receiving hole 12, thereby obtaining the positioning of the receiving hole 12.

In some embodiments of the present disclosure, the first connector 2a may have a structure as shown in FIG. 5a or a structure as shown in FIG. 5b. In FIG. 5b, the first connector 2a is further provided with engaging members 22. In some embodiments of the present disclosure, the engaging members 22 are respectively disposed on two inserting portions 211a and 212a of the first connector 2a, and are disposed near the corner of the first connector 2a.

As shown in FIG. 6a, an engaging member 22 is provided on the second connector 2b. In some embodiments of the present disclosure, there may also be a plurality of engaging members 22, which are disposed on two inserting portions of the second connector 2b.

As described above, the one or more engaging members 22 may be located only on the first connector 2a, or may be located only on the second connector 2b, or the engaging member 22 may be disposed on both the first connector 2a and the second connector 2b. In some embodiments of the present disclosure, the second connector 2b is thicker in a direction perpendicular to a plane where the screen frame is located, and thus there is a larger space in that direction for receiving the engaging member 22, and thus, these embodiments of the present disclosure are described by taking the engaging member 22 disposed on the second connector 2b as an example.

In order to allow the inserting portions 21 to be inserted into suitable positions in the receiving groove 11, the engaging member 22 itself includes a spring or other elastic member, so that a part of the structure of the engaging member 22, for example, the snapping end 221, can extend out of the outer surface of the inserting portion 21 under the action of an elastic force. Correspondingly, the side frames 1 are provided with the receiving holes 12 corresponding to the inserting portions 21. When the inserting portions 21 of the connectors 2 extend into a correct position in the receiving grooves 11, the receiving holes 12 on the side frames 1 and the engaging members 22 on the inserting portions 21 will coincide with each other in position.

In the process of inserting an inserting portion 21 into a receiving groove 11, since the inserting portion 21 of the connector 2 has a shape matching an inner wall of the receiving groove 11, an outer wall of the inserting portion 21 and the inner wall of the receiving groove 11 are maintained fit with each other or have a small gap. At this time, the engaging member 22 provided on the inserting portion 21 abuts against the inner wall of the receiving groove 11, and the snapping end 221 is maintained in a retracted state under the action of an elastic force of the engaging member 22 and a pressure from the side wall of the receiving groove 11. When the inserting portion 21 continues to move into the receiving groove 11 until the engaging member 22 and the receiving hole 12 of the side frame 1 are overlapped in position, the engaging member 22 will lose a constraint from the inner wall of the receiving groove 11, and then the snapping end 221 can be ejected toward the outside of the outer surface of the inserting portion 21 under the action of its own elastic force, and extend into the receiving hole 12. Thus, the snapping end 221 can be snapped with the receiving hole 12, and when the inserting portion 21 has a tendency to continue moving into the receiving groove 11, the snapping end 221 located within the receiving hole 12 will abut against the receiving hole 12, thereby preventing the continued movement of the inserting portion 21, enabling accurate positioning between the connector 2 and the side frame 1. The receiving hole 12 can adopt different forms such as being a through hole.

There may be one engaging member 22 disposed on an inserting portion 21, or a plurality of spaced engaging members 22 disposed on an inserting portion 21. The mounting accuracy between the receiving groove 11 and the inserting portion 21 may be improved by using the plurality of engaging members 22. The number of the engaging members 22 on an inserting portion 21 can be adjusted according to the size and specific structure of the screen frame, which is not limited herein.

In order to allow the engaging member 22 to be maintained in the retracted state during the insertion of the inserting portion 21 into the receiving groove 11 until the snapping end of the engaging member 22 extends into the receiving hole 12, the engaging member 22 should have a telescopic direction different from an inserting direction of the inserting portion 21. For example, the telescopic direction of the engagement member 22 and the inserting direction of the inserting portion 21 are perpendicular to each other. Thus, when the inserting portion 21 is inserted into the receiving groove 11, the distance between the engaging member 22 and the inner wall of the receiving groove 11 is always kept constant, so that the engaging member 22 can always be maintained in the retracted state before the engaging member 22 and the receiving hole 11 coincide in position. Therefore, in some embodiments of the present disclosure, the engaging member 22 is located on a side wall of the inserting portion 21, that is, toward a wall different from the inserting direction of the inserting portion 21, and the telescopic direction of the engaging member 22 and the side wall of the inserting portion 21 are kept perpendicular to each other. In order to facilitate an observation on whether the engaging member 22 has been snapped into the receiving hole 12, the engaging member 22 is generally disposed perpendicular to the plane where the screen frame is located, that is, the engaging member 22 is located on a side of the screen frame facing or facing away from the screen, such that after the engaging member 22 extends into the receiving hole 12, a user can easily observe, from the outer side surface of the screen frame, whether the engagement of the engaging member 22 is completed.

The side wall of the inserting portion 21 are generally parallel to the inserting direction of the inserting portion 21 to facilitate the insertion of the inserting portion 21. Therefore, when the telescopic direction of the engaging member 22 is perpendicular to the side wall of the inserting portion 21, it may correspondingly maintain perpendicular to the inserting direction of the inserting portion 21. At this time, the movement of the inserting portion 21 will not affect the telescopic state of the engaging member 22, so that the operation of the engaging member 22 is relatively reliable.

In order to facilitate a smooth snapping of the engaging member 22 into the receiving hole 12, in some embodiments of the present disclosure, the snapping end 221 of the engaging member 22 may be an arc-shaped end. At this time, in the process of the snapping end 221 entering the receiving hole 12, on one hand, the arc shape of the snapping end 221 can effectively reduce resistance and friction between the snapping end 221 and the edge of the receiving hole 12; and on the other hand, when the snapping end 221 abuts against an edge region of the receiving hole 12, the arc-shaped snapping end 221 can also convert the elastic force of the engaging member 22 into a component force toward the receiving hole 12. At this time, under the action of the component force, the snapping end 221 can automatically ejects toward the receiving hole 12, and the inserting portion 21 is correspondingly driven to a correct position for positioning.

In order to achieve the telescope of the engaging member 22 and the engagement with the receiving hole 12, the engaging member 22 can have various different structures and forms. In some embodiments of the present disclosure, the engaging member 22 can be a spring plunger. The spring plunger is also called a ball plunger, and has an elastic member such as a spring disposed inside, so that the telescopic operation of the plunger can be realized by an elastic force of the elastic member such as the spring.

When the engaging member 22 is a spring plunger, since the spring plunger has a metal structure inside, when the snapping end 221 of the spring plunger extends into the receiving hole 12 and be snapped with the receiving hole 12, the snapping end 221 of the spring plunger will emit a cracking touch sound due to a contact with the side frame 1. After the user hears the touch sound, the user can know that the side frame 1 and the connector 2 are in place, thereby ensuring the mounting accuracy of the assembly positioning and reducing mounting difficulty.

When the engaging member 22 is a spring plunger, a mounting hole or a mounting groove may be disposed on the inserting portion 21 of the connector 2, and the spring plunger is mounted in the mounting hole or the mounting groove through an interference fit or by a mounting thread. At this time, most structure of the spring plunger is buried in the mounting hole or the mounting groove, and the snapping end 221 can protrude out of the outer surface of the inserting portions 21 in an extended state and engage with the receiving hole 12.

An inserting direction of the fastener 3 on the first connector 2a is perpendicular to the plane where the screen frame is located, and an inserting direction of the fastener 3 on the second connector 2b is parallel to the plane where the screen frame is located.

When the first connector 2a is provided with the engaging member 22, the telescopic direction of the engaging member 22 can be the same as the inserting direction of the fastener 3 on the first connector 2a, and the engaging member is disposed away from the inserting direction of the inserting portions 21.

When the second connector 2b is provided with the engaging member 22, the telescopic direction of the engaging member 22 is perpendicular to the inserting direction of the fastener 3 on the second connector 2b. As shown in FIGS. 6b and 6a, the engaging members 22 and the connecting holes 23b on the connector 2b are respectively disposed on the surfaces of different side walls of the inserting portions. In some embodiments of the present disclosure, the engaging members 22 and the connecting holes 23b on the connector 2b are perpendicular to each other.

In some embodiments of the present disclosure, the screen frame is placed flat on a console or on the ground when the screen frame is assembled, such that a rear surface of the screen frame faces the mounter. In order to allow an installer to have a more intuitive observation on the insertion of the connector into the receiving groove of the side frames, the receiving holes on the side walls of the receiving grooves are disposed toward the rear surface of the screen frame, that is, along a direction facing the mounter. Thus, the installer can easily observe tops of the engaging members from the receiving holes.

Referring to FIGS. 2a-7, in some embodiments of the present disclosure, the screen frame is generally a rectangular frame structure, and the side frames 1 correspond to the four sides of the screen frame, and the number of the side frames 1 may generally be four. After the four side frames 1 are connected end to end, a rectangular screen frame can be enclosed. At this time, two adjacent side frames, for example, the side frame 1a and the side frame 1b, respectively correspond to two adjacent sides of the rectangle. Thus, each joint of two adjacent side frames corresponds to a corner position of the screen frame, and the connectors 2 are disposed at the corner position and connect the two side frames 1a and 1b.

There may be two connectors in order to connect the two adjacent side frames 1a and 1b, and each connector is located between the two adjacent side frames, that is, between the side frame 1a and the side frame 1b, and connects and fixes the two side frames 1a and the side frames 1b together through the fasteners 3. In some embodiments of the present disclosure, each of the connectors 2 has connection portions correspondingly connected to different side frames, and the connection portions and the side frames 1 have partial or full overlapping regions, so that a connection can be implemented by means of the connection portions and side frames.

Since the connection portions of the connectors 2 partially or completely overlap with the side frames 1, the fasteners 3 can pass through the connection portions and the corresponding side frames 1 in order to complete the fixing of the side frames 1, thereby connecting and fixing the connectors and the side frames 1 together. The connection portions on the connectors 2 and the side frames 1 may be provided with corresponding connecting holes, the fasteners 3 can pass through these connecting holes, to realize the fixing between the connectors and the side frames 1. In some embodiments of the present disclosure, these connecting holes may be in the form of threaded holes or unthreaded holes, and the fasteners 3 may be in the form of conventional fasteners such as bolts, screws, or rivets.

In order to fix the side frames 1 in different directions, the screen frame includes the first connectors 2a and the second connectors 2b. The first connectors 2a and the second connectors 2b are connected to corresponding side frames 1 by the fasteners such as screws, and the fasteners 3 on the first connectors 2a have a different inserting direction from the fasteners 3 on the second connectors 2b. In some embodiments of the present disclosure, the inserting direction of the fasteners 3 on the first connectors 2a may be perpendicular to the plane where the screen frame is located, and the inserting direction of the fasteners on the second connectors 2b may be parallel to the plane where the screen frame is located. Thus, the side frames 1 can be fixed by the fasteners in both the direction of the plane where the screen frame is located and the direction perpendicular to the plane where the screen frame is located, thereby achieving precise positioning and connection with the connectors 2.

When the inserting direction of the fasteners 3 on the first connectors 2a is parallel to the plane where the screen frame is located, the fasteners 3 for connection with the first connectors 2a will run into the side frames 1 and the first connector 2a along the direction perpendicular to the plane where the screen frame is located. The first connectors 2a can be connected to the two adjacent side frames 1, which are arranged in different directions, by means of a plurality of fasteners 3 respectively.

Since the fasteners on the first connectors 2a and the second connectors 2b connect the side frames 1 and the corresponding connectors 2 along different inserting directions respectively, the fasteners 3 can restrain freedom degrees of the connectors 2 and the side frames 1 in a plurality of different directions (the direction parallel to the plane where the screen frame is located and the direction perpendicular to the plane where the screen frame is located), which allows the side frames 1 to be fixed and limited in a plurality of directions orthogonal to each other, thereby reliably defining spatial positions of the side frames, and avoiding the phenomenon that the side frames 1 are misplaced and the seams thereof are too large due to the inaccurate positioning of the side frames 1. At the same time, during the fastening process, the fasteners 3 will exert a tightening action on the connectors 2 and the side frames 1 by using its own fastening force, so that under the fastening force of the fasteners, the connectors 2 and the side frames 1 are close to each other and correct their own positions, thereby ensuring accurate positioning between the connectors 2 and the side frames 1. Thus, the manner of connecting the side frames 1 by using fasteners with different inserting directions has a low requirement on docking and assembly position between the side frames 1, so that a person who does not have any assembly experience can complete an assembly of the screen frame relatively easily, thereby facilitating a user to freely assemble the screen frame and saving assembly costs.

Since each corner of the screen frame has a first connector 2a and a second connector 2b, correspondingly, a side frame 1 may have two receiving grooves 11 at an end, and the receiving grooves 11 and the connectors 2 are disposed in a one to one manner. When the connectors 2 are mounted to a side frame 1, each of the receiving grooves 11 on the side frame 1 is correspondingly inserted with a connector 2, and the side frame 1 is connected and fixed to another adjacent side frame through the connectors 2.

Since the connectors 2 are used for connecting two adjacent side frames 1a and 1b, correspondingly, as a structural form according to some embodiments of the present disclosure, a connector 2 has two inserting portions 21, which are located at different sides of the connectors 2, respectively, and which are used to connected to different receiving grooves 11 on the corresponding side frame 1, respectively.

In some embodiments of the present disclosure, since the extending directions of the two adjacent side frames 1a and 1b are different, the connectors 2 may also have connecting portions that extend in different directions. The two adjacent side frames 1a and 1b are generally located in the same plane, and length directions of the two side frames are perpendicular to each other, so that the extending directions of the two inserting portions can also be kept perpendicular to each other. At this time, the connectors 2 as a whole may be a structural member having two straight sides which are mutually angled, for example, an "L"-shaped structural member, and the two sides of the structural member may serve as two inserting portions 21 respectively, used to connect to the corresponding side frames. The two inserting portions 21 can be at an angle of 90° at this time.

In addition, the inserting portions of the connectors 2 can also have other structures and extending directions. For example, an inserting portion can have a certain angle with the length direction of a side frame 1 to reduce the assembly difficulty of the connector 2 and the side frame 1, which is not limited herein.

Due to the effect of the overall size of the screen frame, thickness and width of the side frames 1 are greatly limited, so that an overall receiving space of the side frames 1 is limited. Correspondingly, the number of the connectors 2 should not be excessive. For example, the number of the connectors 2 in the joint if two adjacent side frames 1 can be two.

In some embodiments of the present disclosure, the first connector 2a and the second connector 2b are arranged along a radial direction of the screen frame, for example, along a diagonal line of the screen frame. That is, the first connector 2a and the second connector 2b are respectively located on the inner and outer sides of the screen frame along the planar direction. Thus, the first connector 2a and the second connector 2b can be respectively connected to different portions on the inner and outer sides of the side frames 1 to prevent the seam between the two adjacent side frames 1 from being unevenness, namely being wider on one side and narrower on the other side. The first connector 2a may be located on the outer side of the second connector 2b along the radial direction of the entire screen frame, for example, on the outer side of the second connector 2b along the diagonal line of the entire screen frame, that is, near the outer side wall of the screen frame; while the second connector 2b is located near an inner side wall of the screen frame.

For ease of understanding, referring to FIGS. 5a 5b, specific connecting structures of the inserting portion and the receiving groove are described by taking a first connector 2a having two inserting portions which respectively correspond to the side frame 1a and the side frame 1b in two different directions, as an example. The first connector 2a has the inserting portions 211a and 212a facing different directions, and the inserting portion 211a is connected to the side frame 1a by a corresponding fastener (not shown) passing through the connecting hole 23a, and the inserting portion 212a is connected to the side frame 1b by a fastener (not shown) passing through another connection hole 23a. The fasteners connecting different side frames have the same orientation, that is, both are oriented perpendicular to a plane where the side frame 1a and the side frame 1b are located. In some embodiments of the present disclosure, the inserting portions of the first connector 2a are provided with connecting holes (for example, the connection holes 23a provided on the inserting portion 211a and the inserting portion 212a), and referring to FIG. 3a, side walls of the receiving grooves 11 of the side frames 1 are provided with corresponding connecting holes 13, 14, and the first connector 2a and the side frames 1 are connected by fasteners passing through the connecting holes 13, 14. It can be understood that the connecting holes 23a provided on the inserting portion 211a and the connecting holes 23a provided on the inserting portion 212a may have the same orientation.

When a second connector 2b is connected to the side frames 1 by the fasteners 3, similarly, the inserting direction of the fasteners 3, i.e. an axial direction of the fasteners 3, is located in the plane where the screen frame is located. At this time, since the two adjacent side frames 1a and 1b extend in two mutually perpendicular directions, respectively, in the plane where the screen frame is located, the second connector 2b is tightly connected to different side frames by different fasteners, respectively, and the fasteners used to connect different side frames will have different orientations. In some embodiments of the present disclosure, the fasteners in the fasteners 3 used to connect the second connector 2b and the side frames 1 may be fasteners 33 and 34, or the like.

Similar to the first connector 2a, for the sake of understanding, a second connector 2b having two inserting portions which correspond to two side frames 1a and the side frame 1b in two different directions, is taken as an example for description. The second connector 2b has the inserting portions 211b and 212b facing different directions, the inserting portion 211b is connected to the side frame 1a by the fastener 33, and the other inserting portion 212b is connected to the side frames 1b by the fastener 34, where the fasteners 33 and the fasteners 34 are oriented in a plane where the screen frame is located. At this time, in order to respectively connect the two side frames 1a and 1b with different orientations, the fasteners 33 and 34 have different orientations. For example, the fastener 33 is connected to the side frame 1a in a direction parallel to the side frame 1b, and the fastener 34 is connected to the side frame 1b along a direction parallel to the side frame 1a.

In some embodiments of the present disclosure, when the second connector 2b and the side frames 1 are connected by the fasteners 33 and 34, the inserting portions of the second connector 2b may be provided with connecting holes (for example, the connecting holes 23b provided at the inserting portions 211b and 212b), and the side walls of the receiving grooves of the side frames 1a and 1b also provided with connecting holes, and then the fasteners pass through the two connecting holes, thereby connecting the second connector 2b and the corresponding side frames 1a and 1b. The orientations of the connection holes 23b provided on the inserting portion 211b and the connection hole 23b provided at the inserting portion 212b may be perpendicular to each other.

Further, since the orientation of the fastener connected to the second connector 2b is parallel to the plane where the screen frame is located, then in order to enable the fasteners to be reliably connected to the corresponding side frames 1a and 1b, the second connector 2b is connected with at least two fasteners including the fastener 33 and the fastener 34, and an inserting indirection of each of the fasteners is perpendicular to the side frame 1 corresponding to that fastener, in some embodiments of the present disclosure. At this time, the fasteners 3 connect the side frames 1 and the second connector 2b in the directions perpendicular to the length directions of the side frames 1. Since the length directions of the two adjacent side frames 1 are perpendicular to each other, the fasteners 3 connected to the adjacent side frames also maintain mutually perpendicular directions. At the same time, the inserting direction of the fastener 3 connected to the first connector 2a is perpendicular to the plane where the screen frame is located, and thus also maintains perpendicular to the inserting direction of the fastener corresponding to the second connector 2b. As such, the fasteners 3 on the first connector 2a and the second connector 2b can be respectively threaded through the connecting holes 23a and 23b, and fix the connectors 2 (the first connector 2a or the second connector 2b) and the two side frames (the side frame 1a and 1b) together from at least three mutually orthogonal directions respectively, so that the side frames 1 can be fixed in a plurality of directions, and the connection and positioning effect is good, which can effectively reduce the phenomenon that the seam of the side frames 1 is too large and the side frames 1 are misplaced.

In the above embodiment, FIG. 6a can be referred to for a schematic structural diagram of the second connector 2b.

Further, in order to prevent the connectors 2 from being deformed when fixing the side frames 1, a reinforcing structure may be provided on the connectors 2. In some embodiments of the present disclosure, and also as shown in FIG. 6a, a reinforcing structure may be disposed on the second connector 2b, which is taken as an example for the description below. In some embodiments of the present disclosure, a reinforcing rib 24 is disposed between the two inserting portions 211b and 212b of the second connector 2b, so that by the connection of the reinforcing rib 24, the two inserting portions can maintain an original angle when used to connection and subjecting to a farce. The reinforcing rib 24 has limiting surfaces 241 on the sides facing the inserting directions of the inserting portions, where the limiting surfaces are used for abutting against a structure on the side frames 1.

In summary, in various embodiments provided by the present disclosure, the screen frame includes a plurality of side frames that are connected end to end, and a joint of each two adjacent side frames is provided with at least two connectors, the connectors are connected between the two adjacent side frames, and the connectors are connected to the side frames by fasteners. The side frames are provided with receiving grooves, the inserting portions of the connectors and side walls of the receiving grooves can be connected by the fasteners, and at least one inserting portion of the inserting portions of the connectors is provided with one or more telescopic engaging members, and correspondingly, the side walls of the receiving grooves are provided with one or more receiving holes. Therefore, when a fixed connection of the connectors and the side frames is performed, a snapping limiting is realized by the engaging member of the inserting portions and the receiving hole on the side walls of the receiving grooves, which can quickly realize a relative positioning of the connectors and the side frames, thereby improving a mounting efficiency, and can also enable a person who does not have any assembly experience to complete an assembly of the screen frame relatively easily, thereby facilitating a user to freely assemble the screen frame and saving assembly costs.

The at least two connectors comprise a first connector and a second connector, and an inserting direction of a fastener to the first connector is perpendicular to a plane where the screen frame is located, and an inserting direction of a fastener to the second connector is parallel to the plane where the screen frame is located. In this way, by positioning the side frames in a plurality of different directions, such as the direction parallel to the plane where the screen frame is located and the direction perpendicular to the plane where the screen frame is located, the side frames can be fixed and limited in multiple directions orthogonal to each other, which reliably defines spatial positions of the side frames, thereby avoiding the phenomenon that the side frames are misplaced and the seam thereof is too large due to the inaccurate positioning of the side frames, so that a person who does not have any assembly experience can complete an assembly of the screen frame and a laser projection display device relatively easily, thereby facilitating a user to freely assemble the screen frame and saving assembly costs.

Figure 8:
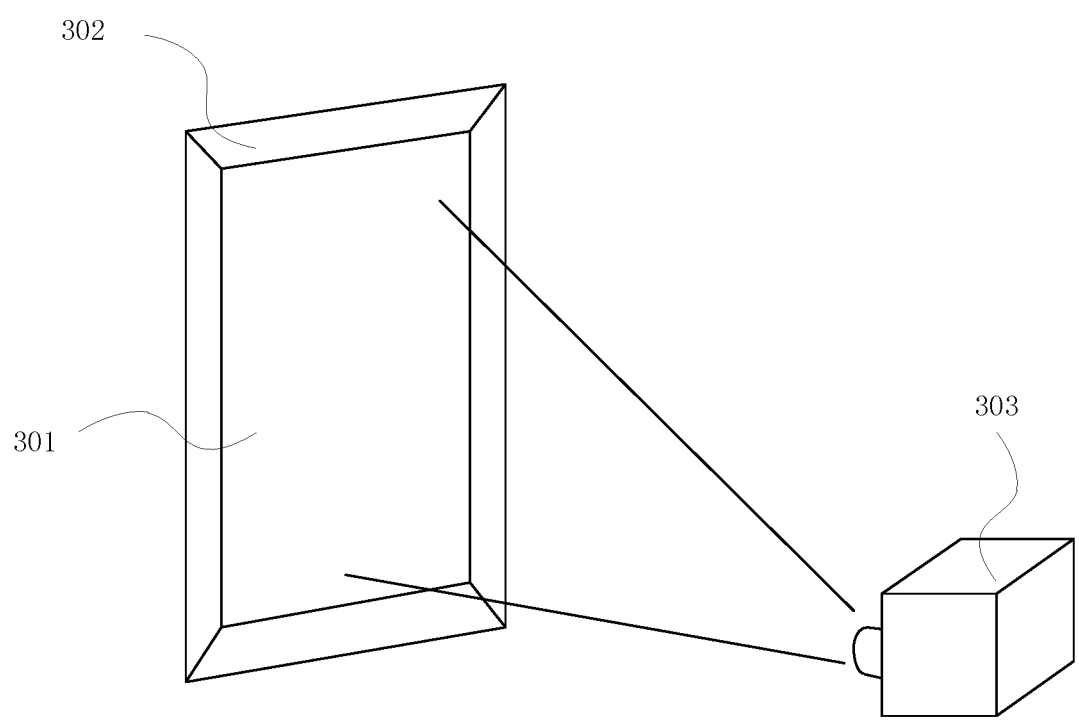
FIG. 8 is a schematic structural diagram of a laser projection display device according to some embodiments of the present disclosure.

Some embodiments of the present disclosure further provide a laser projection display device. FIG. 8 is a schematic structural diagram of a laser projection display device according to some embodiments of the present disclosure. As shown in FIG. 8, the laser projection display device 300 according to some embodiments of the present disclosure includes a projection screen 301 and a screen frame 302 described in the above embodiments, and the screen frame 302 is disposed around the projection screen 301 from outside. Further, the laser projection display device 300 further includes a projection host 303. The specific structure, function, and working principle of the screen frame 302 have been described in detail in the above embodiments, which will not be described herein again.

In some embodiments of the present disclosure, the projection screen 301 in the laser projection display device 300 is typically a soft or rigid optical film, such that the projection screen 301 can be configured to display images projected from the projection host 303. The screen frame 302, which is disposed around the projection screen 301 from outside, can fix and position the projection screen 301, which enables the projection screen 301 to be fixed at a preset position, and extends the projection screen 301 into a flat projection surface. The screen frame 302 may be connected to an edge of the projection screen 301 to fix the projection screen 301.

In addition, the laser projection display device 300 may further include an accessory component such as a support frame, which is not limited herein.

In these embodiments of the present disclosure, the laser projection display device includes a projection screen and a screen frame, and the screen frame is disposed around the projection screen from outside; the screen frame includes a plurality of side frames that are connected end to end, and a joint of each two adjacent side frames is provided with at least two connectors, the connectors are connected between the two adjacent side frames, and the connectors are connected to the side frames by fasteners. Receiving grooves which are corresponding to the at least two connectors in a one to one manner are provided at the joint of the side frame the adjacent side frame, and the connectors have inserting portions that are extendable into the receiving grooves. At least one inserting portion of the inserting portions is provided with a telescopic engaging member, and a side wall of the receiving groove is provided with a receiving hole corresponding to the engaging member, where the engaging member is configured to extend into the receiving hole for positioning. The inserting portions are connected to side walls of the receiving grooves by fasteners, which can quickly realize a relative positioning of the connectors and the side frames, thereby improving a mounting efficiency, so that a person who does not have any assembly experience can complete an assembly of the screen frame relatively easily, thereby facilitating a user to freely assemble the screen frame.

Further, at least two connectors comprise a first connector and a second connector, and an inserting direction of a fastener to the first connector is perpendicular to a plane where the screen frame is located, and an inserting direction of a fastener to the second connector is parallel to the plane where the screen frame is located. In this way, by positioning the side frames in a plurality of different directions, such as the direction parallel to the plane where the screen frame is located and the direction perpendicular to the plane where the screen frame is located, the side frames can be fixed and limited in multiple directions orthogonal to each other, which reliably defines spatial positions of the side frames, thereby avoiding the phenomenon that the side frames are misplaced and the seam thereof is too large due to the inaccurate positioning of the side frames, so that a person who does not have any assembly experience can complete an assembly of the screen frame and a laser projection display device relatively easily, thereby facilitating a user to freely assemble the screen frame and saving assembly costs.

It should be noted that the above embodiments are merely illustrative of the technical solutions of the present disclosure, and are not intended to be limiting; although the present disclosure has been described in detail with reference to the above embodiments, the person skilled in the art will understand that the technical solutions described in the above embodiments may be modified, or some or all of the technical features may be equivalently substituted; and the modifications or substitutions do not deviate the corresponding technical solution from the scope of the technical solutions of the embodiments of the present disclosure.

What is claimed is:

1. A screen frame, comprising: a plurality of side frames that are connected end to end, wherein a joint of each two adjacent side frames of the plurality of side frames is provided with at least two connectors, and the each two adjacent side frames are provided with receiving grooves at the joint of the each two adjacent side frames, wherein the receiving grooves are corresponding to the at least two connectors, and the at least two connectors have inserting portions that are extendable into the receiving grooves, at least one inserting portion of the inserting portions is provided with a telescopic engaging member, and a side wall of a receiving groove which is corresponding to an inserting portion having the engaging member is provided with a receiving hole corresponding to the engaging member;

the engaging member is configured to extend into the receiving hole for positioning; and the inserting portions are connected to side walls of the receiving grooves by fasteners;

wherein the engaging member is fixed to a side wall of the inserting portion on which the engaging member is provided.

2. The screen frame according to claim 1, wherein a telescopic direction of the engaging member is perpendicular to a surface of a side wall of the inserting portion on which the engaging member is provided.

3. The screen frame according to claim 1, wherein a depth direction of the receiving grooves is along a length direction of the side frames.

4. The screen frame according to claim 1, wherein the fasteners pass through the side walls of the receiving grooves and the inserting portions to connect the at least two connectors and the side frames.

5. The screen frame according to claim 1, wherein each of the at least two connectors has two inserting portions, and the two inserting portions are respectively located at different sides of the connectors and respectively connected to different receiving grooves.

6. The screen frame according to claim 5, wherein the at least two connectors comprise a first connector and a second connector, and an inserting direction of a fastener on the first connector is perpendicular to a plane where the screen frame is located, and an inserting direction of a fastener on the second connector is parallel to the plane where the screen frame is located.

7. The screen frame according to claim 6, wherein the first connector and the second connector are arranged along a radial direction of the screen frame, and the first connector is located outside of the second connector.

8. The screen frame according to claim 7, wherein the first connector and the second connector are arranged along a diagonal line direction of the screen frame.

9. The screen frame according to claim 6, wherein there are at least two fasteners connected on the second connector, and an inserting direction of each fastener of the at least two fasteners is perpendicular to a side frame corresponding to that fastener.

10. The screen frame according to claim 6, wherein the engaging member is provided on at least one of the first connector or the second connector.

11. The screen frame according to claim 10, wherein when the second connector is provided with the engaging member, a telescopic direction of the engaging member is perpendicular to the inserting direction of the fastener on the second connector.

12. The screen frame according to claim 10, wherein when the first connector is provided with the engaging member, a telescopic direction of the engaging member is to the same as the inserting direction of the fastener on the first connector.

13. The screen frame according to claim 12, wherein the engaging member is disposed away from an extending direction of the inserting portions.

14. The screen frame according to claim 5, wherein each of the at least two connectors has a plurality of engaging members, which are respectively disposed on different inserting portions.

15. The screen frame according to claim 1, wherein the engaging member comprises a snapping end extendable out of an outer surface of the inserting portion on which the engaging member is provided, and the snapping end is configured to extend into and be snapped within the receiving groove.

16. The screen frame according to claim 15, wherein the snapping end is an arc-shaped end.

17. The screen frame according to claim 1, wherein the engaging member is a spring plunger.

18. The screen frame according to claim 1, wherein the receiving hole is disposed toward a rear surface of the screen frame.

19. A laser projection display device, comprising a projection host, wherein the laser projection display device further comprises a projection screen and a screen frame according to claim 1, and wherein the screen frame is disposed around the projection screen from outside.

20. A screen frame, comprising: a plurality of side frames that are connected end to end, wherein a joint of each two adjacent side frames of the plurality of side frames is provided with at least two connectors, and the each two adjacent side frames are provided with receiving grooves at the joint of the each two adjacent side frames, wherein the receiving grooves are corresponding to the at least two connectors, and the at least two connectors have inserting portions that are extendable into the receiving grooves, at least one inserting portion of the inserting portions is provided with a telescopic engaging member, and a side wall of a receiving groove which is corresponding to an inserting portion having the engaging member is provided with a receiving hole corresponding to the engaging member;

the engaging member is configured to extend into the receiving hole for positioning; and the inserting portions are connected to side walls of the receiving grooves by fasteners;

wherein each of the at least two connectors has two inserting portions, and the two inserting portions are respectively located at different sides of the connectors and respectively connected to different receiving grooves;

wherein the at least two connectors comprise a first connector and a second connector, and an inserting direction of a fastener on the first connector is perpendicular to a plane where the screen frame is located, and an inserting direction of a fastener on the second connector is parallel to the plane where the screen frame is located;

wherein the engaging member is provided on at least one of the first connector or the second connector; and wherein when the second connector is provided with the engaging member, a telescopic direction of the engaging member is perpendicular to the inserting direction of the fastener on the second connector.

\* \* \* \* \*